Figure 1:
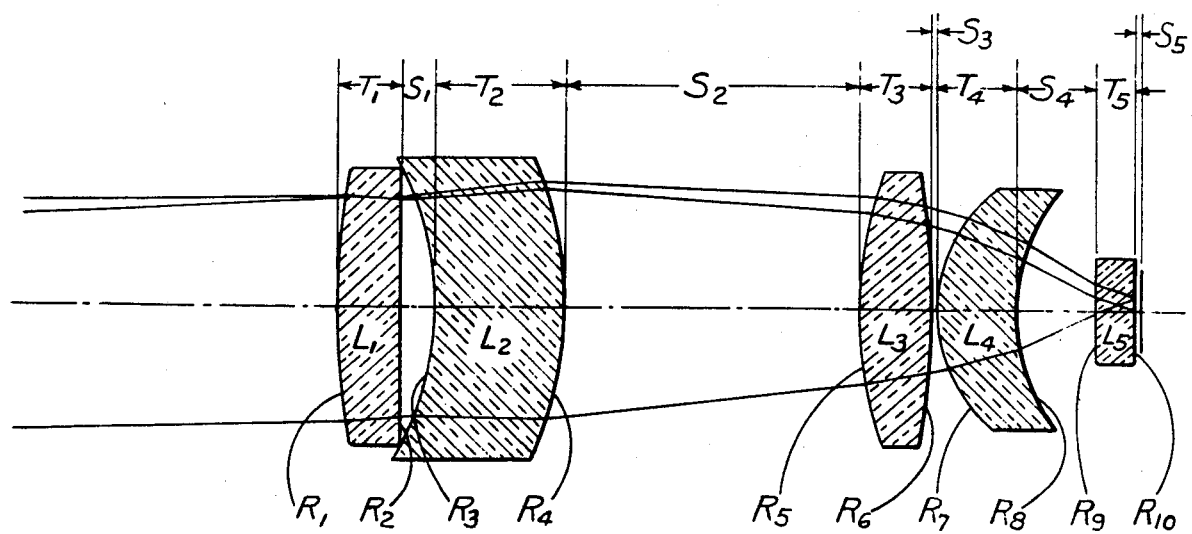

United States Patent [19]

Fleischman

[11] 4,065,205

[45] Dec. 27, 1977

[54] SHORT FOCAL LENGTH OPTICAL SYSTEM WITH LARGE APERTURE

[75] Inventor: Andor A. Fleischman, Northbrook, Ill.

[73] Assignee: Bell & Howell Company, Chicago, Ill.

[21] Appl. No.: 709,047

[22] Filed: July 27, 1976

[51] Int. Cl.² .............................. G02B 9/34; G02B 9/62
[52] U.S. Cl. .................................... 350/216; 350/220
[58] Field of Search ................................ 350/216, 220

[56] References Cited

U.S. PATENT DOCUMENTS

| | | | |
|---|---|---|---|
| 3,915,559 | 10/1975 | Fleischman | 350/220 |
| 3,942,877 | 3/1976 | Fleischman | 350/220 |
| 3,944,338 | 3/1976 | Fleischman | 350/220 |

*Primary Examiner*—Conrad J. Clark
*Attorney, Agent, or Firm*—John E. Peeles, Jr.

[57] ABSTRACT

This invention relates to a large aperture optical system of short focal length primarily intended for efficiently transmitting monochromatic light rays in optical instruments with an extraordinarily high degree of correction over a prescribed field.

3 Claims, 9 Drawing Figures

F/1.11

F/1.59

2.58°

1.82°

SHORT FOCAL LENGTH OPTICAL SYSTEM WITH LARGE APERTURE

This invention relates to a large aperture optical system of short focal length primarily intended for efficiently transmitting monochromatic light rays in optical instruments with an extraordinarily high degree of correction over a prescribed field.

Optical systems have been designed to efficiently transmit light rays to an image plane with an extraordinarily high degree of correction over a prescribed field. Such systems have had spherical elements but have often required that selected of the surfaces of these elements be aspheric to accomplish the desired correction. As with other optical designs, cost improvements can be made without degradation in optical performance by selection of different optical materials.

In the improved embodiments described hereinafter, an optical system of short focal length design and of high effective aperture is shown. The system is designed to image the light rays with minimum degradation onto an image plane at a size reduced from the size of the source, which may be, the focused beam of a low powered laser of the helium-neon type. Because the optical system is intended for use in a mass-produced instrument, such as a video disc player, desired features include light weight, simplicity of design, ease of assembly, and low cost. To accomplish these features, the optical systems are alternatively designed with either all glass elements or combinations of glass and plastic elements. Selected of the elements may well be glass having a high index of refraction while other components are optical materials having a low index of refraction. In the embodiments shown, the "active" elements are all spherical, and the first and fourth elements of a high index glass while the internal elements are of low index optical materials. The resulting optical systems are of relatively light weight and relatively low cost. These systems are diffraction limited over the prescribed field, thereby providing an image of substantially higher performance characteristics than might be anticipated.

An object of the invention is to provide a large effective aperture, short focal length optical system for efficient transmission of essentially monochromatic light rays from a light source of limited diameter and to image the rays without degradation onto an image plane at a smaller size than the size of the source.

Other objects and advantages of the invention will become apparent from the detailed description which follows when considered in conjunction with the accompanying drawings in which:

FIG. 1 is a diagrammatic sectional view of a preferred embodiment of an optical system according to the present invention; and FIGS. 2a to 2h are graphical representations of the various aberrations of the lens system of FIG. 1 and having the design data given in Table 1.

Referring to the drawings, an optical system is shown for critically imaging essentially monochromatic light rays from a source having a limited diameter. In this preferred embodiment, the light rays are generated by a source such as a focused laser having a wavelength of 6563 Angstroms. The arrangement of the optical elements, as hereinafter described, provides for imaging the bundle of light rays on an image plane as a point source of extremely small diameter, while providing a light weight, highly corrected optical system which can be economically manufactured.

The optical systems as defined in the Tables 2 and 3 have arrangements of elements and aberration curves similar to the arrangements and curves of the optical system shown in FIGS. 1 and 2, and having the design data given in Table 1. Since the differences would not be readily apparent in drawings, further drawings have not been included.

At the ray entrance side of the system (to the left as shown in FIG. 1), and positioned nearest the not shown light source is a first element $L_1$. This slightly positive element is of high index optical material, and causes the light beam which exits therefrom to be slightly convergent.

A second element $L_2$ is axially separated and air spaced from the first element $L_1$. Element $L_2$ is a negative meniscus element which collects the slightly convergent light rays from the first element and re-directs the rays to an air spaced third element $L_3$.

The third element $L_3$ is of slightly positive power and functions with another positive element $L_4$ as a positive power component group. Together, this group relays the light bundle toward the image plane to form a reduced image of the object. Element $L_4$ is of high refractive index glass as is the first element $L_1$. Elements $L_2$ and $L_3$ are of significantly lower index optical materials.

A planar member $L_5$ of glass or other optical material is essentially a relatively thin protective cover to reduce the possiblity of potential damage to a surface carrying optically coded information at the image plane. The optical designs may be modified to be used with or without the protective cover. Also, although shown in a predetermined position between element $L_4$ and the image plane, the cover element may be variably positioned.

The optical system of FIG. 1 is an objective with an 8.25mm (0.3253 inch) focal length having an effective aperture of $f/1.16$. The system has a half angle of field of 2.58° and is essentially diffraction limited over this prescribed field. As seen in FIGS. 2a–2h, which diagrammatically represent aberrations of FIG. 1, the optical system has a combined large effective aperture, an extremely short focal length and a high degree of correction.

The design data of the optical system of FIG. 1 is as follows:

TABLE 1

EFL = 8.26mm (.3253 inches)
Half Angle of Field = 2.58°
(Dimensions in Inches where applicable)

| Lens | Radii | Thickness | Spacing | $N_D$ | V |
|---|---|---|---|---|---|
| $L_1$ | $R_1$ = .9100 | | | | |
|  | $R_2$ = 52.8905 | $T_1$ = .0780 | $S_1$ = .0410 | 1.805 | 25.4 |
| $L_2$ | $R_3$ = −.3670 | | | | |
|  | $R_4$ = .4500 | $T_2$ = .1580 | | 1.494 | 66.1 |
|  |  |  | $S_2$ = .3800 | | |
| $L_3$ | $R_5$ = .5000 | | | | |
|  | $R_6$ = .9966 | $T_3$ = .0910 | | 1.494 | 66.1 |
|  |  |  | $S_3$ = .0030 | | |
| $L_4$ | $R_7$ = .1780 | | | | |
|  | $R_8$ = −.2170 | $T_4$ = .1000 | | 1.805 | 25.4 |
|  |  |  | $S_4$ = .1000 | | |
| $L_5$ | $R_9$ = Inf. | | | | |
|  | $R_{10}$ = Inf. | $T_5$ = .0433 | | optical | |
|  |  |  | $S_5$ = .0050 | | material |

In all of the tables, the first column lists the lens elements numerically starting at the ray entrance side of the system. The second column lists the respective radii of surfaces of the elements. In all of the tables the positive and negative signs given the respective radii follow the "lensmaker's convention," to facilitate fabrication of the individual lens elements, wherein convex surfaces are positive and concave surfaces are negative. The third column lists the thickness of the respective elements. The fourth column lists the spacing between adjacent elements and the image plane. The fifth and sixth columns respectively list the refractive index $N_D$ and the dispersive index V of the elements. "EFL" is the effective focal length of the lens system. "Half Angle of Field" is the angle between the continuation of the lens axis and a line from the nodal point of the lens to the most oblique point of the field carrying coded information.

FIGS. 2a–2h graphically represent various aberrations related to the form of the optical system as shown schematically in FIG. 1 and having the design data recited in Table 1.

Figure 2A:
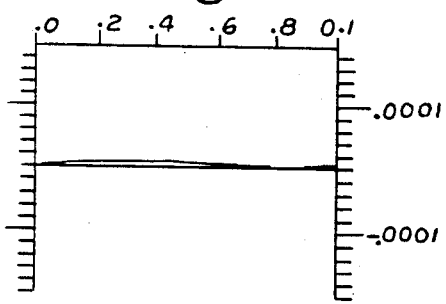
Figure 2B:
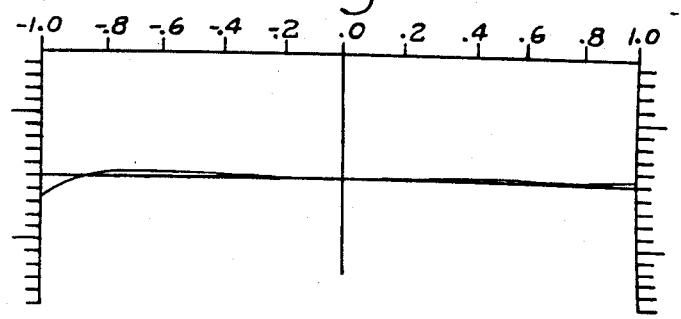
Figure 2C:
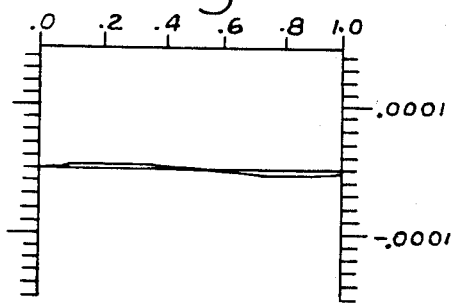
Figure 2D:
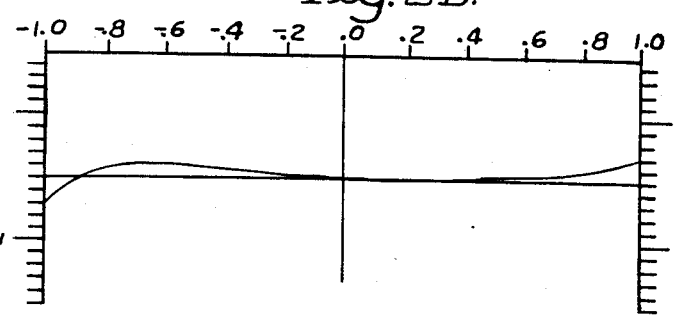
Figure 2E:
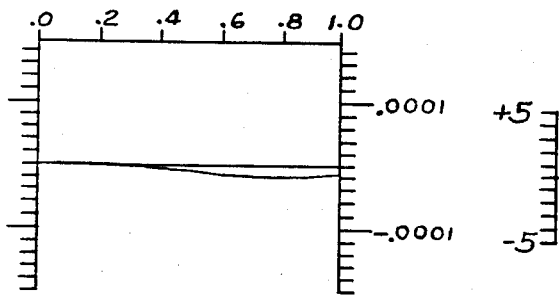
Figure 2F:
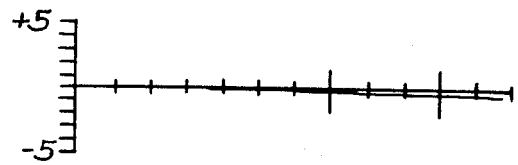
Figure 2G:
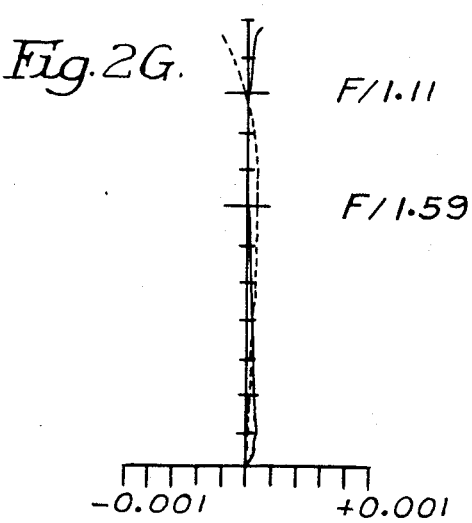
Figure 2H:
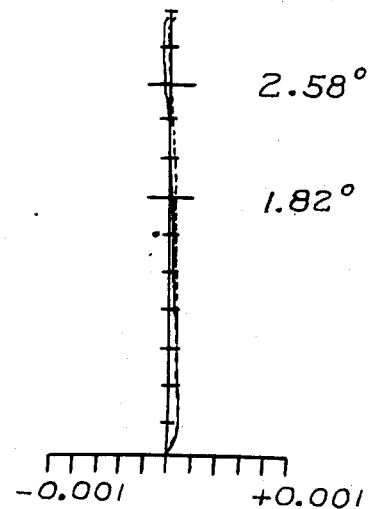

FIG. 2a represents axial monochromatic correction of the wavelength forming rays on axis. FIG. 2b represents off axis aberrations of a ray passing from the zone of the image format and through the lens transversely and tangentially. FIG. 2c represent the aberrations of the rays passing from the corner of the image format through the lens tangentially and transversely. FIG. 2d represents the radial or longitudinal abberations from the zone of the image format of rays entering the lens at 3 o'clock, while FIG. 2e represents similar aberrations from full field or corner rays. FIG. 2f represents distortion as a percentage of a "perfect" image. FIG. 2g represents the spherical aberration by a full line and the offense-against-sine-condition by the dotted line. FIG. 2h represents the curvature of field with the tangential curvature being shown in full line and the sagittal curvature being shown in dashed lines.

Other embodiments of the optical system provide a high degree of correction similar to the all glass design of FIG. 1 and Table 1. These optical systems have a construction similar to the construction of the FIG. 1 system, but are slightly less expensive in that at least one of the non-high index elements is molded of an optical plastic material, such as an acrylic, particularly a polymethylemthacrylate. Such a plastic element enables the desired degree of correction to be obtained with relatively less weight than a comparable glass element, and probably at a lower manufacturing cost since the element can be molded rather than being ground and polished. Additionally, since the plastic element is an internal element of the system, the likelihood of the element being damaged or abraded is reduced, notwithstanding that it is slightly softer than glass. That is, once assembled, the outer glass elements protect the inner elements from inadvertent scratches, dust, and fingerprints even when the system is without the cover plate.

The design data of the second embodiment is as follows:

TABLE 2

EFL = 8.26mm (.3251 inches)
Half Angle of Field = 2.58°
(Dimensions in Inches where applicable)

| Lens | Radii | Thickness | Spacing | $N_D$ | V |
|---|---|---|---|---|---|
| $L_1$ | $R_1$ = .9100<br>$R_2$ = 52.8905 | $T_1$ = .0760 | | 1.805 | 25.4 |
| | | | $S_1$ = .0410 | | |
| $L_2$ | $R_3$ = −.3670<br>$R_4$ = .4500 | $T_2$ = .1590 | | 1.490 | 57.4 |
| | | | $S_2$ = .3790 | | |
| $L_3$ | $R_5$ = .5000<br>$R_6$ = .9966 | $T_3$ = .0920 | | 1.494 | 66.1 |
| | | | $S_3$ = .0030 | | |

TABLE 2-continued

EFL = 8.26mm (.3251 inches)
Half Angle of Field = 2.58°
(Dimensions in Inches where applicable)

| Lens | Radii | Thickness | Spacing | $N_D$ | V |
|---|---|---|---|---|---|
| $L_4$ | $R_7$ = .1780<br>$R_8$ = −.2170 | $T_4$ = .1000 | | 1.805 | 25.4 |
| | | | $S_4$ = .1000 | | |
| $L_5$ | $R_9$ = Inf.<br>$R_{10}$ = Inf. | $T_5$ = .0433 | | optical | material |
| | | | $S_5$ = .0049 | | |

The data listed in the several columns above in Table 2 and below in Table 3 is defined as explained with respect to Table 1.

The third embodiment of the optical system is shown in Table 3 which follows:

TABLE 3

EFL = 8.26mm (.3251 inches)
Half Angle of Field = 2.57°
(Dimensions in Inches where applicable)

| Lens | Radii | Thickness | Spacing | $N_D$ | V |
|---|---|---|---|---|---|
| $L_1$ | $R_1$ = .9100<br>$R_2$ = 52.8905 | $T_1$ = .0780 | | 1.805 | 25.4 |
| | | | $S_1$ = .0390 | | |
| $L_2$ | $R_3$ = −.3659<br>$R_4$ = .4482 | $T_2$ = .1600 | | 1.490 | 57.4 |
| | | | $S_2$ = .3750 | | |
| $L_3$ | $R_5$ = .4925<br>$R_6$ = .9966 | $T_3$ = .0950 | | 1.490 | 57.4 |
| | | | $S_3$ = .0030 | | |
| $L_4$ | $R_7$ = .1780<br>$R_8$ = −.2170 | $T_4$ = .0990 | | 1.805 | 25.4 |
| | | | $S_4$ = .1010 | | |
| $L_5$ | $R_9$ = Inf.<br>$R_{10}$ = Inf. | $T_5$ = .0433 | | optical | material |
| | | | $S_5$ = .0046 | | |

What is claimed is:

1. An optical system of short focal length and large effective aperture having substantially the following specification:

EFL = 8.26mm (.3253 inches)
Half Angle of Field = 2.58°
(Dimensions in Inches where applicable)

| Lens | Radii | Thickness | Spacing | $N_D$ | V |
|---|---|---|---|---|---|
| $L_1$ | $R_1$ = .9100<br>$R_2$ = 52.8905 | $T_1$ = .0780 | | 1.805 | 25.4 |
| | | | $S_1$ = .0410 | | |
| $L_2$ | $R_3$ = −.3670<br>$R_4$ = .4500 | $T_2$ = .1580 | | 1.494 | 66.1 |
| | | | $S_2$ = .3800 | | |
| $L_3$ | $R_5$ = .5000<br>$R_6$ = .9966 | $T_3$ = .0910 | | 1.494 | 66.1 |
| | | | $S_3$ = .0030 | | |
| $L_4$ | $R_7$ = .1780<br>$R_8$ = −.2170 | $T_4$ = .1000 | | 1.805 | 25.4 |
| | | | $S_4$ = .1000 | | |
| $L_5$ | $R_9$ = Inf.<br>$R_{10}$ = Inf. | $T_5$ = .0433 | | optical | material |
| | | | $S_5$ = .0050 | | | wherein the first column lists the lens elements numerically; the second column lists the respective radii of the elements, using the convention that convex surfaces have positive radii and concave surfaces have negative radii; the third column lists the respective thickness of the elements; the fourth column lists the axial spacings between adjacent elements; and the fifth and sixth columns list respectively the dispersion and refractive indices of the optical materials for the lens.

2. An optical system of short focal length and large effective aperture having substantially the following specification:

EFL = 8.26mm (.3251 inches)
Half Angle of Field = 2.58°
(Dimensions in Inches where applicable)

| Lens | Radii | Thickness | Spacing | $N_D$ | V |
|---|---|---|---|---|---|
| $L_1$ | $R_1 =$ .9100<br>$R_2 =$ 52.8905 | $T_1 =$ .0760 | | 1.805 | 25.4 |
| | | | $S_1 =$ .0410 | | |
| $L_2$ | $R_3 =$ −.3670<br>$R_4 =$ .4500 | $T_2 =$ .1590 | | 1.490 | 57.4 |
| | | | $S_2 =$ .3790 | | |
| $L_3$ | $R_5 =$ .5000<br>$R_6 =$ .9966 | $T_3 =$ .0920 | | 1.494 | 66.1 |
| | | | $S_3 =$ .0030 | | |
| $L_4$ | $R_7 =$ .1780<br>$R_8 =$ −.2170 | $T_4 =$ .1000 | | 1.805 | 25.4 |
| | | | $S_4 =$ .1000 | | |
| $L_5$ | $R_9 =$ Inf.<br>$R_{10} =$ Inf. | $T_5 =$ .0433 | | optical | material |
| | | | $S_5 =$ .0049 | | | wherein the first column lists the lens elements numerically; the second column lists the respective radii of the elements, using the convention that convex surfaces have positive radii and concave surfaces have negative radii; the third column lists the respective thicknesses of the elements; the fourth column lists the axial spacings between adjacent elements; and the fifth and sixth columns list respectively the dispersion and refractive indices of the optical materials for the lens.

3. An optical system of short focal length and large effective aperture having substantially the following specification:

EFL = 8.26mm (.3251 inches)
Half Angle of Field = 2.57°
(Dimensions in Inches where applicable)

| Lens | Radii | Thickness | Spacing | $N_D$ | V |
|---|---|---|---|---|---|
| $L_1$ | $R_1 =$ .9100<br>$R_2 =$ 52.8905 | $T_1 =$ .0780 | | 1.805 | 25.4 |
| | | | $S_1 =$ .0390 | | |
| $L_2$ | $R_3 =$ −.3659<br>$R_4 =$ .4482 | $T_2 =$ .1600 | | 1.490 | 57.4 |
| | | | $S_2 =$ .3750 | | |
| $L_3$ | $R_5 =$ .4925<br>$R_6 =$ .9966 | $T_3 =$ .0950 | | 1.490 | 57.4 |
| | | | $S_3 =$ .0030 | | |
| $L_4$ | $R_7 =$ .1780<br>$R_8 =$ −.2170 | $T_4 =$ .0990 | | 1.805 | 25.4 |
| | | | $S_4 =$ .1010 | | |
| $L_5$ | $R_9 =$ Inf.<br>$R_{10} =$ Inf. | $T_5 =$ .0433 | | optical | material |
| | | | $S_5 =$ .0046 | | | wherein the first column lists the lens elements numerically; the second column lists the respective radii of the elements, using the convention that convex surfaces have positive radii and concave surfaces have negative radii; the third column lists the respective thicknesses of the elements; the fourth column lists the axial spacings between adjacent elements; and the fifth and sixth columns list repsectively the dispersion and refractive indices of the optical materials for the lens.

* * * * *